United States Patent
Oikawa (10) Patent No.: US 7,913,013 B2
(45) Date of Patent: Mar. 22, 2011

(54) SEMICONDUCTOR INTEGRATED CIRCUIT

(75) Inventor: Kohei Oikawa, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 143 days.

(21) Appl. No.: 12/254,250

(22) Filed: Oct. 20, 2008

(65) Prior Publication Data

US 2009/0119429 A1    May 7, 2009

(30) Foreign Application Priority Data

Nov. 7, 2007    (JP) ................................. 2007-290178

(51) Int. Cl.
*G06F 13/00* (2006.01)
*G06F 12/00* (2006.01)

(52) U.S. Cl. ..................... 710/110; 710/241; 711/106

(58) Field of Classification Search .................. 710/110, 710/241; 711/106
See application file for complete search history.

(56) References Cited

U.S. PATENT DOCUMENTS

| | | | | |
|---|---|---|---|---|
| 6,397,287 B1 * | 5/2002 | Brown et al. | ................. | 710/305 |
| 6,636,913 B1 * | 10/2003 | Batchelor et al. | ............. | 710/107 |
| 6,877,049 B1 * | 4/2005 | Myers | .............................. | 710/56 |
| 6,993,617 B2 * | 1/2006 | Butcher et al. | ................ | 710/305 |
| 7,472,213 B2 * | 12/2008 | Fukuyama et al. | ............ | 710/241 |
| 7,564,722 B2 * | 7/2009 | Klein | ......................... | 365/185.33 |
| 7,640,392 B2 * | 12/2009 | Walker | ........................... | 711/106 |
| 7,707,379 B2 * | 4/2010 | Bartley et al. | ................. | 711/167 |
| 2002/0062414 A1 * | 5/2002 | Hofmann et al. | ............. | 710/110 |
| 2002/0199052 A1 * | 12/2002 | Moyer | .......................... | 710/113 |
| 2004/0117791 A1 * | 6/2004 | Prasad et al. | .................. | 718/100 |
| 2005/0254335 A1 * | 11/2005 | Wang | ............................. | 365/232 |
| 2006/0149857 A1 * | 7/2006 | Holman | ............................ | 710/3 |
| 2006/0271715 A1 * | 11/2006 | Harris et al. | .................. | 710/110 |
| 2007/0115751 A1 | 5/2007 | Kim et al. | | |
| 2008/0163032 A1 * | 7/2008 | Lastras-Montano | .......... | 714/785 |
| 2008/0189479 A1 * | 8/2008 | Cope et al. | .................... | 711/104 |
| 2008/0266988 A1 * | 10/2008 | Sohn et al. | ............... | 365/189.17 |

FOREIGN PATENT DOCUMENTS

JP     2004-355271     12/2004

OTHER PUBLICATIONS

The Advantages of Hard Subsystems in embedded Processor PLDs, Altera, Mar. 2002.*

* cited by examiner

*Primary Examiner* — Mark Rinehart
*Assistant Examiner* — Christopher A Daley
(74) *Attorney, Agent, or Firm* — Oblon, Spivak, McClelland, Maier & Neustadt, L.L.P.

(57) ABSTRACT

A semiconductor integrated circuit according to an aspect of the invention includes a plurality of master devices which issue data transfer requests, at least one slave device which performs data transfer in accordance with the data transfer requests, and a network which arbitrates the plurality of data transfer requests respectively issued from the plurality of master devices, and informs the slave device of the arbitration result, thereby performing data transfer between the master devices and the slave device, wherein when issuing the data transfer request, the master device informs the network of a period which extends from the issuance of the data transfer request to the start of the data transfer.

20 Claims, 7 Drawing Sheets

SEMICONDUCTOR INTEGRATED CIRCUIT

CROSS-REFERENCE TO RELATED APPLICATIONS

This application is based upon and claims the benefit of priority from prior Japanese Patent Application No. 2007-290178, filed Nov. 7, 2007, the entire contents of which are incorporated herein by reference.

BACKGROUND OF THE INVENTION

1. Field of the Invention

The present invention relates to a semiconductor integrated circuit, and more particularly, it relates to a data transfer apparatus.

2. Description of the Related Art

In a data transfer apparatus, an operation module which issues a data transfer request accesses a memory controller via a network. A plurality of operation modules transmit command signals and data signals to the memory controller when issuing the data transfer requests. When a split transaction method is employed as a data transfer method, the transmission and reception of the command signals and the data signals are periodically independently controlled.

A write operation is described below in the data transfer apparatus wherein there are provided two operation modules and the memory connected to the memory controller is a dynamic random access memory (DRAM).

Assume a case where, in writing in the DRAM (write operation), the first and second operation modules issue write commands, and the network transfers a command signal of the first operation module to the memory controller before transferring a command signal of the second operation module to the memory controller.

In this case, if a data signal of the first operation module is output at an extremely late timing after the memory controller has received the command signal and accepted the data transfer request, the data transfer of the second operation module cannot be executed until the data transfer of the first operation module finishes in order to observe the order of writing.

That is, even if the data in the second operation module is already transmittable, the second operation module is put on standby until the data transfer of the first operation module finishes. Moreover, the network and the memory controller are also put on standby so that the data transfer is not executed. As a result, data transfer efficiency decreases.

On the other hand, there is a method wherein the network arbitrates the data transfer requests of the operation modules before the data in the first and second operation modules are ready. However, in this method, the DRAM has to secure a certain period of time from address notification accomplished by the transmission and reception of the command signals to writing of the data signals. Therefore, in this case, the standby state is generated until the data transfer to the DRAM even if the data signals have arrived at the memory controller. Thus, the efficiency of the data transfer decreases, and in order to prevent this, it is necessary to provide a buffer circuit in a system and increase the buffer size.

In a read operation (reading) as well, a problem similar to that in the write operation arises, and the whole system is put on standby, so that the data transfer efficiency decreases.

For example, Jpn. Pat. Appln. KOKAI Publication No. 2004-355271 has been disclosed as a technique that solves the above-mentioned problem. In the technique disclosed in Jpn. Pat. Appln. KOKAI Publication No. 2004-355271, the whole data transfer apparatus needs to be under central control, so that system design becomes more difficult as the system scale increases. Moreover, accesses are based on a major cycle, and the transfer efficiency therefore decreases, particularly when there is a variation in data transfer amount between the modules.

BRIEF SUMMARY OF THE INVENTION

A semiconductor integrated circuit according to an aspect of the invention comprising:

a plurality of master devices which issue data transfer requests; at least one slave device which performs data transfer in accordance with the data transfer requests; and a network which arbitrates the plurality of data transfer requests respectively issued from the plurality of master devices, and informs the slave device of the arbitration result, thereby performing data transfer between the master devices and the slave device, wherein when issuing the data transfer request, the master device informs the network of a period which extends from the issuance of the data transfer request to the start of the data transfer.

DETAILED DESCRIPTION OF THE INVENTION

An embodiment of the present invention will hereinafter be described in detail with reference to the drawings.

1. Outline

The embodiment of the present invention relates to a semiconductor integrated circuit, and more particularly, it relates to a data transfer apparatus.

The data transfer apparatus in the embodiment of the present invention is characterized in that when a plurality of master devices issue data transfer requests to a slave device, the master devices inform a network interposed between the master devices and the slave device of a period extending from the issuance of the requests to data transfer.

As a concrete example, when data transfer processing is performed, the master device outputs, to the slave device, not only a command signal as the data transfer request but also a signal carrying information on latency between the command signal and a data signal input/output in accordance with the command signal (hereinafter referred to as a latency signal). That is, the latency signal is input to the network in addition to the command signal and the data signal, which allows input/output between the master device and the slave device. In the present embodiment, for example, the latency signal indicates the number of cycles from the input of the command signal to the slave device to the start of the data transfer between the master device and the slave device. Moreover, in the present embodiment, the network arbitrates the order of the data transfer requests of a plurality of master devices on the basis of this latency signal.

Thus, even when a plurality of master devices and a slave device are provided in one data transfer apparatus, the order of data transfer can be arbitrated on the basis of this latency signal. This enables the data transfer to be executed without generating the standby state of the data transfer. Thus, according to the embodiment of the present invention, it is possible to improve the data transfer efficiency of the semiconductor integrated circuit.

It is to be noted that in the embodiment of the present invention, the slave device is a device whose operation is controlled on the basis of the data transfer request issued from the master device.

2. Embodiment (1) Basic Configuration
(a) Circuit

Figure 1:
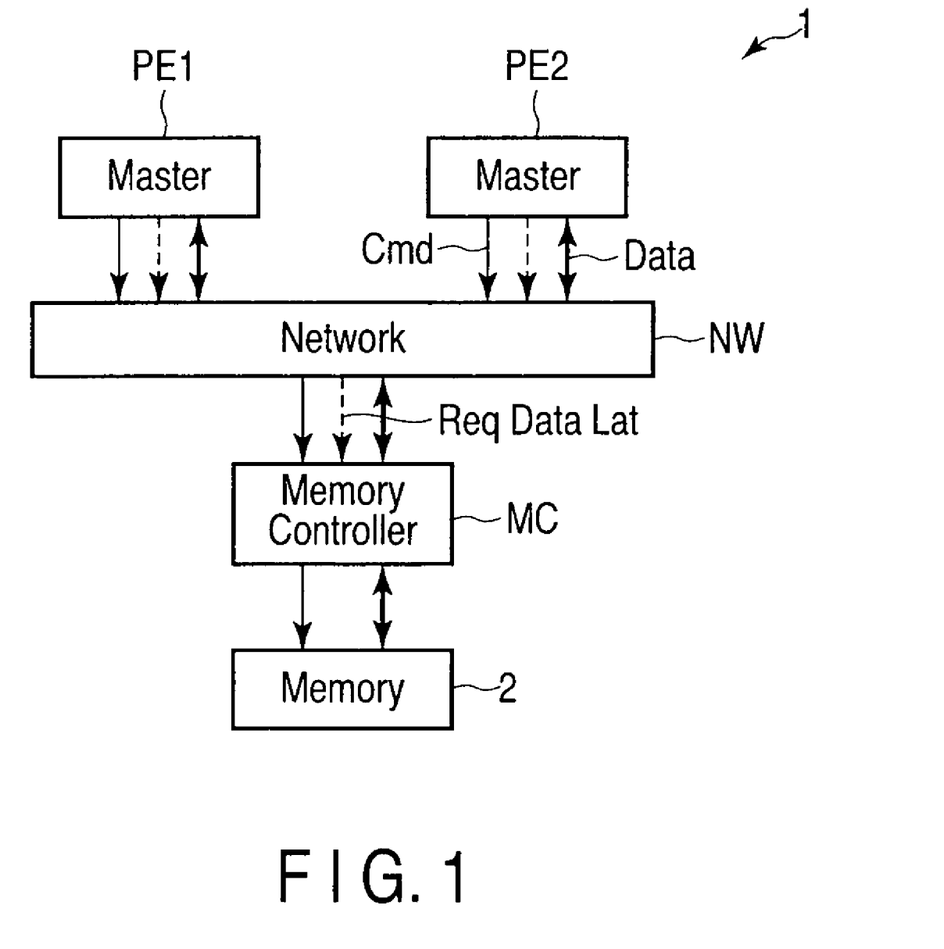
FIG. 1 is a block diagram showing the basic configuration of a data transfer apparatus in an embodiment of the present invention.

The semiconductor integrated circuit in the embodiment of the present invention is described with FIG. 1.

The semiconductor integrated circuit in the embodiment of the present invention is, for example, a data transfer apparatus. FIG. 1 shows the basic configuration of a data transfer apparatus 1. This data transfer apparatus 1 comprises a plurality of operation modules PE1, PE2, a network NW, a memory controller MC and a memory module 2.

In this data transfer apparatus 1, for example, command transfer and data transfer are respectively controlled by temporally independently executed protocols based on a split transaction method. In the data transfer apparatus 1 of the present embodiment, the operation modules PE1, PE2 function as master devices, and the memory controller MC and the memory module 2 function as slave devices whose operations are controlled by the plurality of operation modules PE1, PE2 that are master devices.

The plurality of operation modules PE1, PE2 are connected to the network NW. When executing data transfer, each of the operation modules PE1, PE2 issues a data transfer request (e.g., a command signal Cmd) to the network NW, and outputs the command signal Cmd as the data transfer request to the memory controller MC via the network NW. In accordance with this command signal Cmd, the operation modules PE1, PE2 as the master devices control the operations of the memory controller MC and the memory module 2 as the slave devices, and input/output data signals Data. The operation modules PE1, PE2 are, for example, central processing units (CPUs), direct memory access (DMA) controllers or digital signal processors (DSPs). In addition, although two operation modules are shown for simplicity in explanation in the present embodiment, there is not limit in number, and three or more operation modules may be connected to the network NW.

The network NW arbitrates the order of data transfer for the data transfer requests (command signals) respectively issued from the plurality of operation modules, when these requests are simultaneously issued. Then, on the basis of the arbitration result, data is transferred between the operation module whose request has been accepted and the memory controller as well as the memory module in accordance with the data transfer requests (command signals) issued from the operation modules PE1, PE2. For example, a crossbar method or a common bus method is used for the network NW.

The memory controller MC is connected to the network NW. The memory controller MC accepts the data transfer requests from the operation modules PE1, PE2 input via the network NW, and manages an operation schedule for the data transfer between the operation modules PE1, PE2 whose requests have been accepted and the predetermined memory module 2 to which the data is to be transferred.

The memory module 2 is connected to the memory controller MC, and the operation schedule of this memory module 2 is managed by the memory controller MC. Thus, the requested data transfer is executed between the memory module 2 and the predetermined operation modules PE1, PE2 via the memory controller MC and the network NW. For example, a DRAM, a static random access memory (SRAM) or a flash memory is used for the memory module 2. Moreover, it may be an embedded memory module in which a memory chip and an LSI chip are mixed.

In addition, the data transfer apparatus 1 shown in FIG. 1 shows the basic configuration in the embodiment of the present invention, and may further have other components.

The data transfer apparatus 1 in the embodiment of the present invention is characterized in that when the operation modules PE1, PE2 issue the data transfer requests (command signals), the network NW interposed between the operation modules PE1, PE2 and the memory controller MC as the slave device is informed of not only the command signal Cmd but also a period extending from the issuance of the data transfer requests to the start of the data transfer.

In the present embodiment, this period corresponds to the operation clock of the data transfer apparatus, and is indicated by the number of cycles (latency) from the issuance of the command signals to the start of the transfer of the data signals.

That is, the operation modules PE1, PE2 output signals carrying latency information (latency signals) to the network NW in addition to the command signals. Moreover, the latency signals are also output to the memory controller MC as the slave device, for example, via the network NW. The network NW arbitrates the order of the data transfer processing on the basis of a latency signal ReqDataLat. Then, the data transfer is carried out between the operation modules PE1, PE2 and the memory module 2 in the arbitrated order. Details of the method of arbitrating the data transfer by the network NW will be described later.

Conventionally, when a plurality of operation modules are provided in one data transfer apparatus, the data transfer processing is carried out in accordance with a priority order preset for the respective operation modules. That is, the data transfer processing is carried in accordance with the set priority order, so that even when the data transfer processing for the operation module with a low priority order is ready, the data transfer processing for the operation module with the low priority order is put on standby if the data transfer processing for the operation module with a high priority order has not been executed and completed. This causes the whole system to be put on standby and contributes to a decrease in the data transfer efficiency of the data transfer apparatus.

On the contrary, in the embodiment of the present invention, the data transfer processing is executed in the order arbitrated on the basis of the latency signal ReqDataLat. That is, according to the present embodiment, a cycle which enables the data transfer processing to be started is determined from the values of the latency signals ReqDataLat output from the plurality of operation modules PE1, PE2, and the order of the data transfer processing is arbitrated by the network NW so that the standby state of the system is not generated. Therefore, according to the embodiment of the present invention, it is possible to inhibit the standby state of the data transfer processing and improve the data transfer efficiency of the data transfer apparatus 1. Such an effect of the present embodiment is higher particularly in the case of a data transfer apparatus (semiconductor integrated circuit) using a DRAM which has a time lag from the start of control over the slave devices (the memory controller MC and the memory module 2) to actual data transfer.

Furthermore, the value indicated by the latency signals ReqDataLat is changed as needed with the size of a data signal Data and with how each operation module operates, so that the data transfer processing requested by a user can be flexibly handled.

Still further, according to the present embodiment, buffer circuits for improving the data transfer efficiency can be reduced, so that the buffer size in the system can be reduced, and the system scale of the data transfer apparatus 1 can be reduced.

As described above, according to the embodiment of the present invention, it is possible to improve the data transfer efficiency of the semiconductor integrated circuit (data transfer apparatus).

(b) Write Operation

Figure 2:
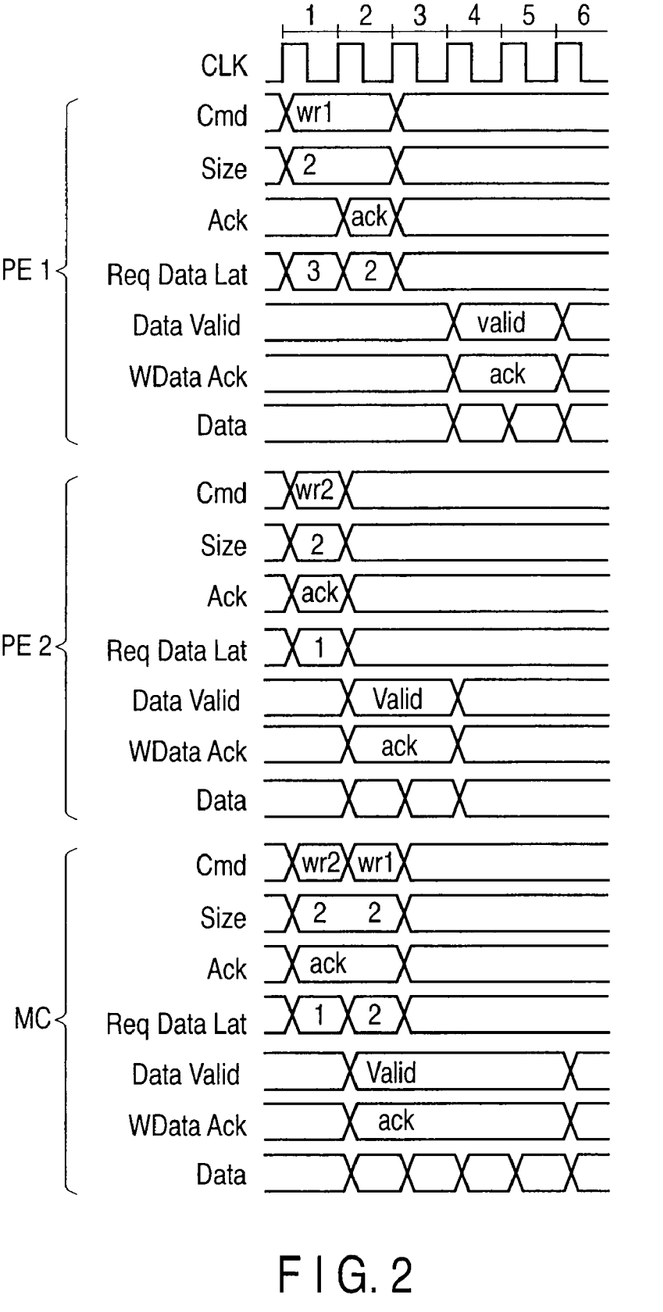
FIG. 2 is a timing chart showing a write operation of the data transfer apparatus in the embodiment of the present invention.

A write operation in the data transfer apparatus shown in the embodiment of the present invention is next described with FIG. 2. FIG. 2 is a timing chart showing the write operation of the data transfer apparatus in the present embodiment. First, signals shown in FIG. 2 are explained.

The command signal Cmd indicates the kind of the data transfer request issued by the operation module PE1, PE2. An enable signal Ack indicates that the command signal Cmd has been accepted by the memory controller MC. A data transfer size signal Size is a signal indicating the size (volume) of data to be transferred and is corresponding to a period of the data transfer. A write valid data signal WDataValid is a signal indicating that the data signal Data is valid in a particular cycle. A write data enable signal WDataAck is a signal indicating that the data signal Data has been accepted by the memory controller MC. Then, the latency signals ReqDataLat are output from the operation modules PE1, PE2 together with the command signals Cmd, and indicate the period from the output of the command signals Cmd to the start of the transfer of the data signals. In addition, an address signal indicating the transfer destination of the data signal Data is also output simultaneously with the command signal Cmd, but the address signal is not described here.

The write operation in the present embodiment is described below on the assumption that there is no delay (latency) in the network NW and the network NW is capable of data transfer with zero latency for simplicity. In addition, in the present embodiment, preferential data transfer is carried out in the preset priority order of the operation modules, for example, in the order of the operation module PE1 and the operation module PE2 when the data transfer requests are issued from the plurality of operation modules PE1, PE2 with difference timings.

First, as shown in FIG. 2, at the first cycle of the operation clock CLK of the data transfer apparatus, the two operation modules PE1, PE2 shown in FIG. 1 simultaneously issue the data transfer requests (command signals) for executing the write operation to the memory controller MC via the network NW. At this moment, the command signals Cmd indicating write operations wr1, wr2 are simultaneously output from the two operation modules PE1, PE2 to the memory controller MC via the network NW. Moreover, the latency signals ReqDataLat are also output from the operation modules PE1, PE2 to the memory controller MC via the network NW together with the command signals Cmd.

With regard to the latency signals ReqDataLat, the cycle of the data output from the two operation modules PE1, PE2 is determined by the network NW on the basis of the values indicated by the latency signals, and the order of the data transfer processing for the operation modules PE1, PE2 is arbitrated by an arbitration method described later. In the example shown in FIG. 2, the respective latency signals ReqDataLat indicate that the data output of the operation module PE1 is executed three cycles later and the data output of the operation module PE2 is executed one cycle later. That is, the data transfer processing for the operation module PE2 is ready earlier than the data transfer processing for the operation module PE1. Therefore, the network NW arbitrates and sets the order of the data transfer processing so that the write operation of the operation module PE1 is executed after the write operation of the operation module PE2 has been executed.

Furthermore, the command signals Cmd and the latency signals ReqDataLat are input to the memory controller MC. On the basis of the result of the arbitration by the network NW, the enable signal Ack is output from the memory controller MC to the operation module PE2 and then to the operation module PE1.

When the enable signal Ack is input to the operation module PE2 at the second cycle, the data transfer processing is immediately executed in the operation module PE2 because the data signal Data to be output has already been prepared. Therefore, data valid signals DataValid and the write data enable signals WDataAck in the operation module PE2 and the memory controller MC become active at the second to third cycles, and the data transfer for the write operation of the operation module PE2 to the memory controller MC and the memory module 2 is executed. Further, the data transfer processing for the operation module PE2 is completed at the third cycle.

On the other hand, in the operation module PE1, the preparation for the output of the data signal Data is completed at the third cycle from the transmission of the command signal Cmd even if the enable signal Ack is input at the third cycle. Therefore, in the operation module PE1, the data valid signal DataValid and the write data enable signal WDataAck become active synchronously with the fourth cycle of an operation clock CLK, and the data transfer for the write operation is executed. The data transfer processing for the operation module PE1 is completed at the fifth cycle. In addition, as described above, the data transfer for the operation module PE2 is executed while the operation module PE1 is preparing the data signal Data to be transmitted, so that the standby state of the data transfer is not generated in the data transfer apparatus.

The write operation in the data transfer apparatus of the present embodiment is completed by the above-mentioned operation. In addition, in the above-mentioned operation, the value indicated by the latency signal ReqDataLat only represents the value of the latency from the output of the command signals Cmd of the operation modules PE1, PE2 to the output of the data signal Data. However, when the size of the command signal Cmd is large, the timing for the data transfer may be delayed in accordance with the size. Therefore, it is preferable for the value indicated by the latency signal ReqData-Lat to be changed in consideration of the size of the command signal.

In the case where the priority order of the data transfer request of the operation module PE1 is set higher than the operation module PE2 and the data transfer is executed in accordance with the priority order as has been the case heretofore, if the memory controller MC accepts the simultaneously issued data transfer requests, the data transfer for the operation module PE2 is executed after the data transfer for the operation module PE1 has been finished, so that a standby state is generated in the system from the second to third cycle. As a result, the data transfer processing for the two operation modules PE1, PE2 is completed at or after the seventh cycle, which reduces the data transfer efficiency of the data transfer apparatus.

However, in the present embodiment, the network NW determines the output cycles of the data signals Data from the latency signals ReqDataLat output from the operation modules PE1, PE2, and arbitrates the order of the write operations. That is, in the data transfer apparatus 1 in the present embodiment, the data transfer processing for the write operations is continuously executed in consideration of the latencies of the plurality of operation modules PE1, PE2 so that the standby state of the system is not generated. Thus, in the data transfer apparatus 1 in the present embodiment, the data transfer processing can be completed at the fifth cycle.

Consequently, in the write operation of the data transfer apparatus in the embodiment of the present invention, the data transfer processing can be accomplished without generating a standby state in the data transfer processing.

Therefore, according to the embodiment of the present invention, it is possible to improve the data transfer efficiency of the semiconductor integrated circuit.

(c) Read Operation

Figure 3:
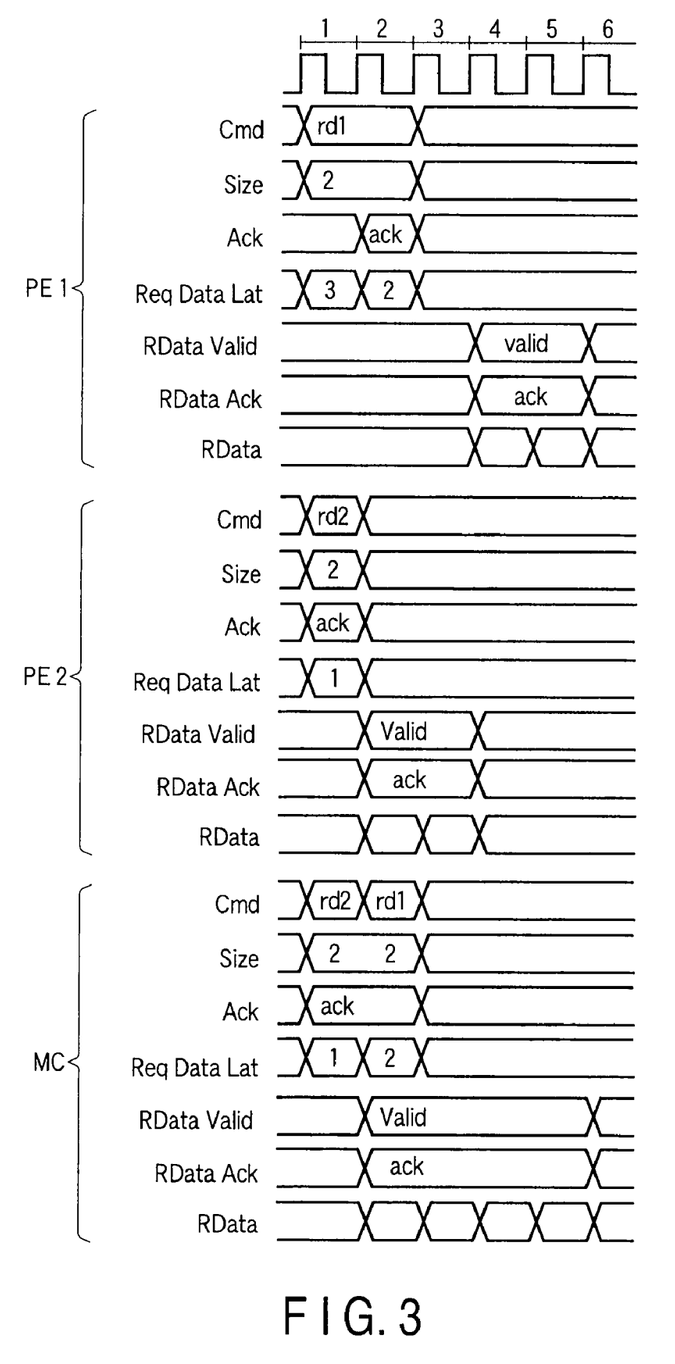
FIG. 3 is a timing chart showing a read operation of the data transfer apparatus in the embodiment of the present invention.

A read operation in the data transfer apparatus shown in the first embodiment of the present invention is described with FIG. 3. It is to be noted that the same signs are assigned to the same signals as in the write operation and such signals are not described in detail. A read valid data signal RDataValid shown in FIG. 3 is a signal indicating that the data signal Data is valid in a particular cycle, and a read data enable signal RdataAck is a signal indicating that the data signal Data has been accepted by the memory controller MC.

First, as in the write operation, the data transfer requests for the execution of the read operation are issued from the operation modules PE1, PE2 at the first cycle of the operation clock CLK, and the command signals Cmd indicating read operations rd1, rd2 are simultaneously output to the memory controller MC via the network NW. In conjunction with this, the latency signals ReqDataLat are also output from the operation modules PE1, PE2 to the memory controller MC via the network NW.

The network NW determines the cycle of data input to the two operation modules PE1, PE2 from the values of the latency signals ReqDataLat.

In the example shown in FIG. 3, the respective latency signals ReqDataLat indicate that the data output of the operation module PE1 can be input three cycles later and the data output of the operation module PE2 can be input one cycle later. Therefore, the network NW arbitrates the order of the processing of data transfer from the memory module 2 to the operation modules PE1, PE2 so that the read operation of the operation module PE1 is executed after the read operation of the operation module PE2 has been executed. Thus, the enable signal Ack is output from the memory controller MC to the operation module PE2 and then to the operation module PE1.

In the operation module PE2, the enable signal Ack is input at the second cycle. As the operation module PE2 is ready to receive the data signal Data, the data transfer processing is immediately executed. Therefore, the read data valid signal RDataValid and the read data enable signal RdataAck in the operation module PE2 and the memory controller MC become active at the second to third cycles, and the data transfer for the read operation in the operation module PE2 is executed. Further, the data transfer processing for the operation module PE2 is completed at the third cycle.

On the other hand, in the operation module PE1, the preparation for receiving the data signal Data is completed at the third cycle from the output of the command signal Cmd even if the enable signal Ack is input at the third cycle. Therefore, in the operation module PE1, the read data valid signal RDataValid and the read data enable signal RdataAck become active synchronously with the fourth cycle of the operation clock CLK at which the read operation of the operation module PE2 has been completed, and the data transfer for the read operation is executed.

The read operation in the data transfer apparatus of the present embodiment is completed by the above-mentioned operation.

As described above, in the read operation of the data transfer apparatus in the embodiment of the present invention, the data transfer processing can be accomplished without generating a standby state in the data transfer processing, as in the write operation.

Therefore, according to the embodiment of the present invention, it is possible to improve the data transfer efficiency of the semiconductor integrated circuit.

(2) Examples

Examples of the components in the data transfer apparatus 1 shown in FIG. 1 are described below in more detail with FIG. 4 to FIG. 6. It is to be noted that the same signs are assigned to the same parts as those described above and such parts are not described in detail.

(a) Network

Figure 4:
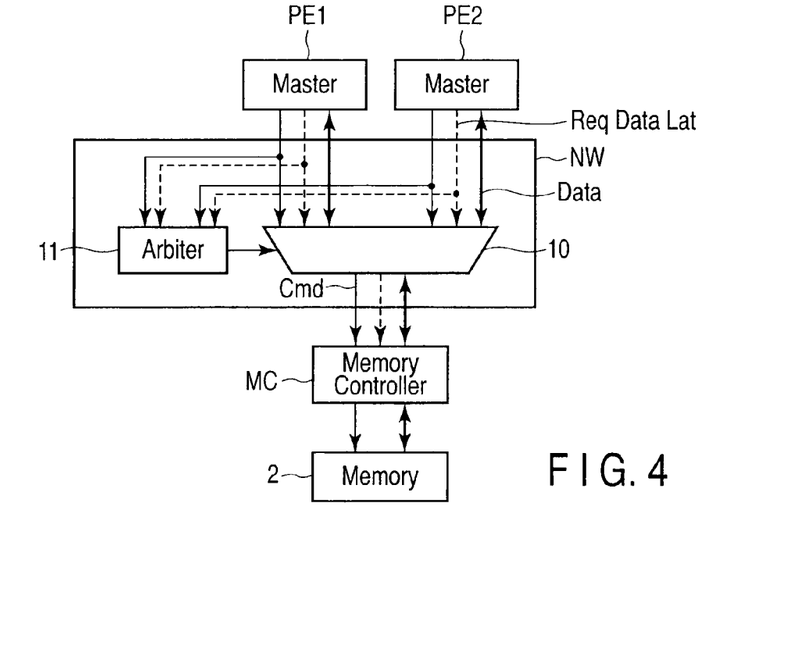
FIG. 4 is a block diagram showing the internal configuration of a network in the embodiment of the present invention.

An example of a network NW used in the data transfer apparatus 1 shown in FIG. 1 is described with FIG. 4. As described above, the network NW makes arbitration when data transfer requests are simultaneously issued from a plurality of operation modules PE1, PE2 in the data transfer apparatus 1.

As shown in FIG. 4, the operation modules PE1, PE2 are connected to the network NW, and a multiplexer 10 and an arbiter 11 are provided on the network NW.

The operation modules PE1, PE2 output command signals Cmd and latency signals ReqDataLat, and data signals Data are input and output accordingly.

The command signals Cmd, the latency signals ReqDataLat and the data signals Data are input to the multiplexer 10 in the network NW. Moreover, the command signals Cmd and the latency signals ReqDataLat are input to the arbiter 11 in the network NW.

The arbiter 11 arbitrates the data transfer requests of the operation modules PE1, PE2 on the basis of the input command signals Cmd and latency signals ReqDataLat. Then, the arbiter 11 outputs a control signal based on the result of the arbitration to the multiplexer 10. The multiplexer 10 outputs one of the input command signals Cmd and one of the input latency signals ReqDataLat of the two operation modules PE1, PE2 to a memory controller MC by the control signal, and then outputs the other data transfer request to the memory controller MC.

Thus, the network NW arbitrates the order of the data transfer request processing, and inputs and outputs the data signals Data.

Several examples of arbitration methods performed by the network NW are described below.

(i) First Arbitration Method

In a first arbitration method, arbitration is made by comparing the values of a plurality of latency signals input to the arbiter 11. Specifically, the network NW in this arbitration method makes an arbitration to execute data transfer so that the data transfer request with a smaller latency signal value is given priority out of the data transfer requests of the operation modules PE1, PE2.

According to the first arbitration method, the arbiter 11 can be realized by a simple circuitry such as a comparator, and the priority order of the data transfer requests can be determined quickly.

(ii) Second Arbitration Method

As described above, in the embodiment of the present invention, the priority order of the operation modules is set in advance for the case where the data transfer requests are issued with no overlap.

In a second arbitration method, when the sum of the value of the latency signal ReqDataLat of a certain operation module and the value of a corresponding data transfer size signal Size is equal to or less than the value of the latency signal ReqDataLat of the operation module set to a high priority degree, even the data transfer request of the operation module with a low priority order is accepted so that the order of data transfer is reversed regardless of the preset priority order, thereby carrying out data transfer.

If the value of the data transfer size signal Size is high as described above, the data transfer may be delayed. Therefore, in the second arbitration method, the order of the data transfer requests is arbitrated according not only to the magnitude of the value of the latency signal ReqDataLat but also latency attributed to the value of the data transfer size signal Size, so that even if the value of the latency signal of the operation module set to a high priority order is high, the data transfer request can be executed first.

Consequently, according to the second arbitration method, it is possible to avoid unnecessary delay of the data transfer request of the operation module with a high priority order.

(iii) Third Arbitration Method

In a third arbitration method, when the value of the latency signal of a certain operation module is higher than a preset threshold value, the data transfer request of the certain operation module is not accepted even if there are no data transfer requests from other operation modules.

When a data transfer request (command signal Cmd) with a high latency signal ReqDataLat value is accepted, the command signal is only input, and actual data transfer is not executed for a long time. Thus, even if a data transfer request with a low latency signal ReqDataLat value is input later, data transfer cannot be executed, which substantially leads to the standby state of the system.

However, as in the third arbitration method, the threshold value is set, and if the data transfer request corresponding to the latency signal ReqDataLat higher than the threshold value is not accepted, it is possible to accept and execute a data transfer request which is input later and which corresponds to the latency signal ReqDataLat lower than the threshold value, and avoid the situation where data transfer is not executed for a long time in the data transfer apparatus 1.

In addition, it is preferable for the threshold value set in the third arbitration method to be calculated on the basis of a value which is an addition of latency from the arbiter 11 to the memory controller MC to latency from the issuance of an address in the memory module to the input/output of data. In addition, the threshold value can be desirably changed during operation in the third arbitration method. Moreover, the third arbitration method can be used together with the first or second arbitration method.

As described above, the arbiter 11 for arbitrating the data transfer requests from a plurality of operation modules is provided in the network NW for the arbitration of data transfer requests shown in FIG. 4, and the data transfer efficiency of the semiconductor integrated circuit can be improved by employing one of the arbitration methods shown in (i) to (iii).

(b) Operation Modules

Figure 5:
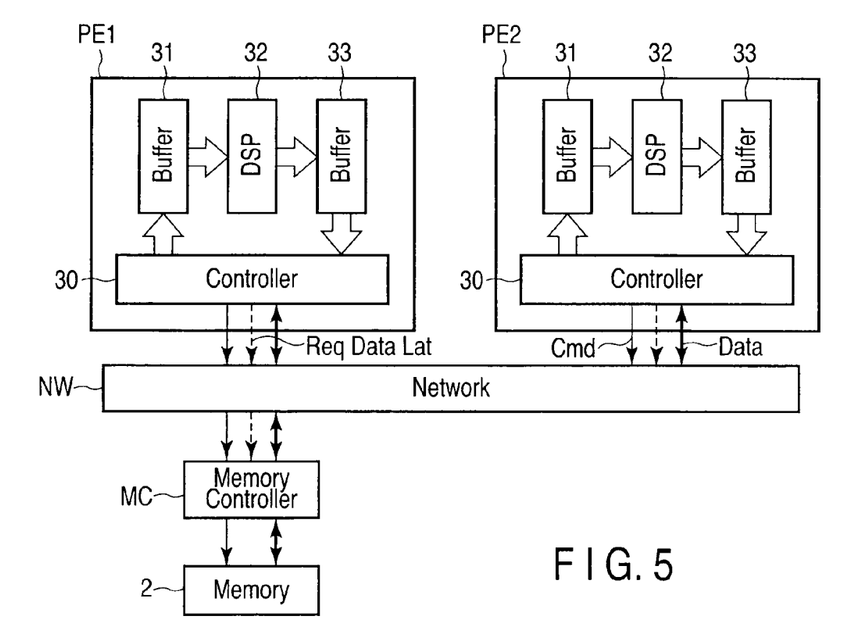
FIG. 5 is a block diagram showing the internal configurations of operation modules in the embodiment of the present invention.

An example of the operation modules used in the data transfer apparatus 1 shown in FIG. 1 is described with FIG. 5.

As shown in FIG. 5, a plurality of operation modules PE1, PE2 are connected to one network NW.

Each of the operation modules PE1, PE2 has a controller 30, data buffers 31, 33, and an operator 32 therein. The buffers 31, 33 are, for example, instruction cache memories or data cache memories. Moreover, the operator 32 is, for example, a DSP, and the operator 32 is hereinafter called a DSP 32. However, the operator 32 may be a CPU. In addition, the internal configurations of the operation modules PE1, PE2 are not limited to the configurations shown in FIG. 5. For example, they may be DMA controllers including no explicit operators.

The controller 30 controls the overall operations of the operation modules PE1, PE2. The buffer 31 stores, via the controller 30, data input in the operation modules PE1, PE2. The DSP 32 operates the data retained in the buffer 31. The buffer 33 retains the data operated by the DSP 32, and outputs the data to the controller 30. Then, the controller 30 outputs the operated data to a memory module 2 via the network NW and a memory controller MC. Thus, the data in the memory module 2 is rewritten to the operated data. Such processing is performed in each of the operation modules PE1, PE2 every time the data transfer processing is carried out.

Here, for example, when it is predicted that one operation for the operation module PE1 finishes in 100 cycles, the operation module PE1 outputs a write command signal or a read command signal as a data transfer request to the network NW simultaneously with the start of the operation. Further, this command signal is output from the network NW to the memory controller MC. The value of a latency signal issued simultaneously with this command signal is set at, for example, "100". When the latency signal is set in this manner, the memory controller MC performs scheduling for the memory module 2 on the assumption that the data transfer processing is started 100 cycles later.

Thus, with appropriate operation timing, the memory controller MC can control the memory module 2 for example, the output of an address signal to the memory module 2.

As described above, in the operation processing in the operation modules PE1 to PE2 whose operation cycles are predicted, a schedule is previously set, before the end of the operation processing, in the memory module 2 to which the results of the operations are transferred, such that it is possible to reduce, for example, the standby state of the data transfer processing and also reduce data latency in the operation modules and thus improve the operation processing efficiency. Consequently, it is possible to improve the data transfer efficiency of the semiconductor integrated circuit.

(c) Memory Controller

Figure 6:
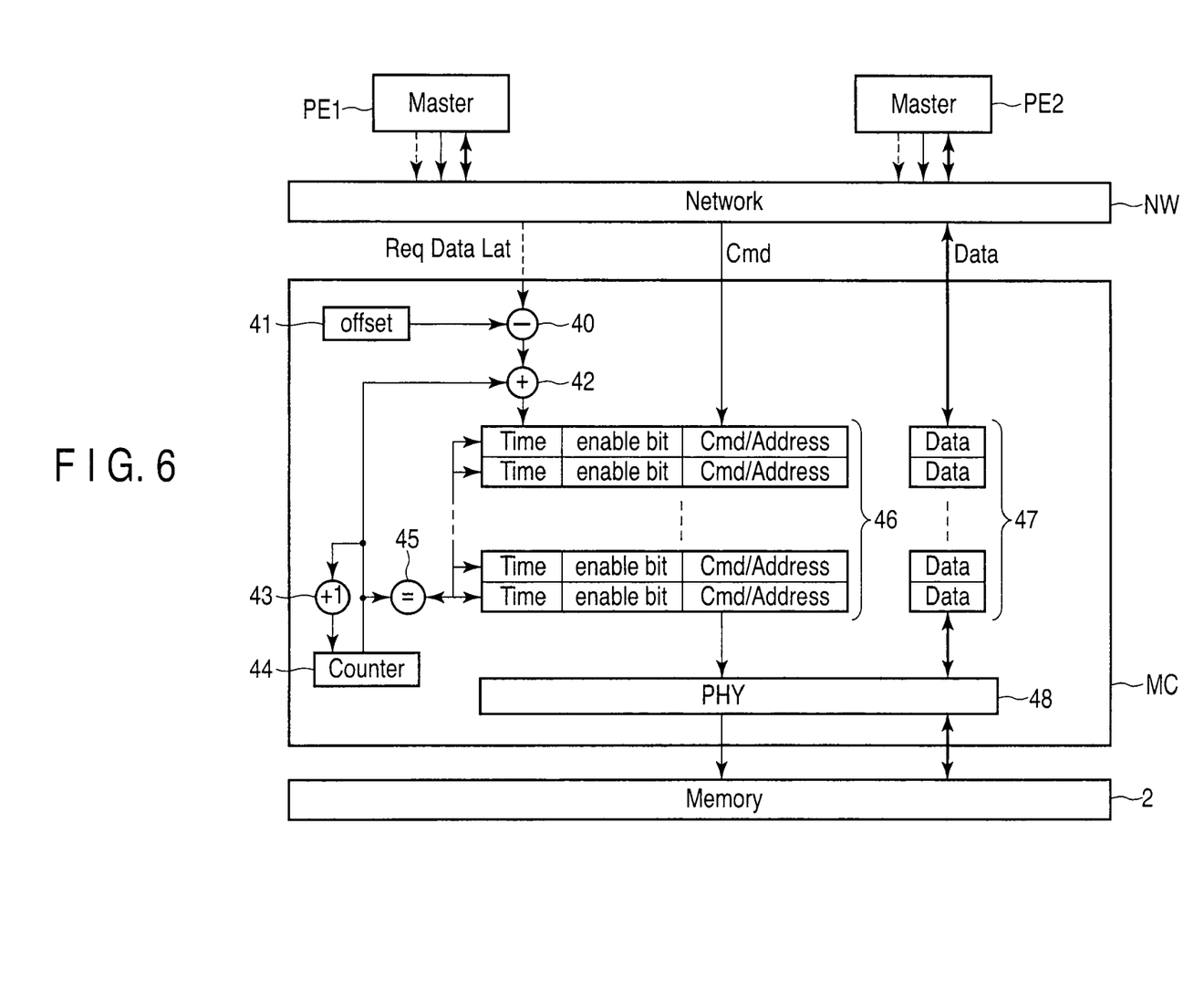
FIG. 6 is a block diagram showing the internal configuration of a memory controller in the embodiment of the present invention.

An example of the memory controller MC used in the data transfer apparatus 1 shown in FIG. 1 is described with FIG. 6. As described above, in the embodiment of the present invention, the data transfer requests issued from a plurality of operation modules are arbitrated by the network NW on the basis of the latency signal.

The memory controller MC having an internal configuration shown in FIG. 6 accepts the arbitration result, and performs scheduling for the memory module 2. As shown in FIG. 6, the latency signal ReqDataLat is input to a subtracter 40 provided in the memory controller MC. An offset value retained in a register 41 is further input to the subtracter 40. Then, the subtracter 40 subtracts the offset value from the value of the input latency signal ReqDataLat. Thus, the latency before access control can be started (hereinafter referred to as access start enable latency) is found. This offset value is preferably set on the basis of, for example, the value of CAS latency of the memory module 2. In addition, the CAS latency is the latency required from the output of a CAS signal designating an address of a column to the actual execution of the writing/reading of the data signal.

Furthermore, a counter 44 is provided in the memory controller MC. This counter 44 is always incremented by an adder 43 on a regular cycle during the operation of the data transfer apparatus. The value of the counter 44 obtained by the increment indicates a "current time" in the memory controller MC. The "current time" is updated by the increment simultaneously with the operation cycle of the whole data transfer apparatus 1 or the operation cycles of the operation modules PE1, PE2.

Furthermore, the "access start enable latency" and the "current time" are added together by an adder 42, and this additional value indicates the time at which the control of the access to the memory module can be started (hereinafter referred to as "access start enable time").

The value of the access start enable time is retained in a plurality of registers 46 provided in the memory controller MC for the respective corresponding command signals Cmd. In addition, the registers 46 are first-in first-out (FIFO) type registers, and the registers 46 are hereinafter called FIFOs 46. At the same time, data signals Data corresponding to the command signals Cmd are retained in registers 47, respectively.

The value of the "access start enable time" stored in the FIFOs 46 is compared by a comparator 45 with the value of the "current time" indicated by the counter 44.

Furthermore, an enable bit of the FIFO in which the "access start enable time" coincides with the "current time" or in which the "access start enable time" is equal to or less than the "current time" becomes active, so that the command signal Cmd retained in that FIFO is validated. The validated command signal Cmd, an address signal Address indicating the input/output end of data, and the data signal Data retained in the register 47 corresponding to the command signal Cmd are output to the memory module 2 after physical and electric conversions such as digital/analog conversion and voltage conversion by a physical layer circuit (PHY) 48. Then, the operation of writing to or reading from the memory module 2 is started, and the data transfer is executed. Such a comparison between the "access start enable time" and the "current time" is sequentially performed for each of the FIFOs 46, and data transfers are sequentially performed for the command signals Cmd satisfying the condition. In addition, when there is no delay or there is a small delay attributed to a circuit such as the PHY 48 provided after the comparator 45, this access start enable time is the time at which the data transfer is substantially started (data transfer enable time).

Thus, the data transfer processing is executed between the operation modules PE1, PE2 and the memory module 2 via the network NW.

As described above, the memory controller MC shown in FIG. 6 performs scheduling for the memory module 2 so that the command signal is executed in which the value of the "access start enable time (data transfer start time)" based on the latency signal and reflecting the result of the arbitration by the network NW is equal to or less than the "current time" indicated by the counter 44 in the memory controller MC. Thus, the memory controller MC can manage the operation of the memory module 2 on the basis of the latency signal ReqDataLat, and regulate the timing of the data transfer.

Consequently, it is possible to improve the data transfer efficiency of the semiconductor integrated circuit.

In addition, one memory controller MC is provided in the example shown in FIG. 6, but the present invention is not limited to this, and a plurality of memory controllers of a similar configuration may be provided. When a plurality of memory controllers MC are provided, the command signal Cmd is selected in such a manner as to improve the efficiency of the access to the memory module 2, thereby making it possible to improve the data transfer efficiency. Moreover, the internal configuration of the memory controller MC may be such that the timing of the data transfer to the memory module 2 (execution of the command signal Cmd) can be regulated in accordance with the latency signal ReqDataLat input to the memory controller MC, and the internal configuration of the memory controller MC is not limited to the configuration shown in FIG. 6.

(3) Application

Figure 7:
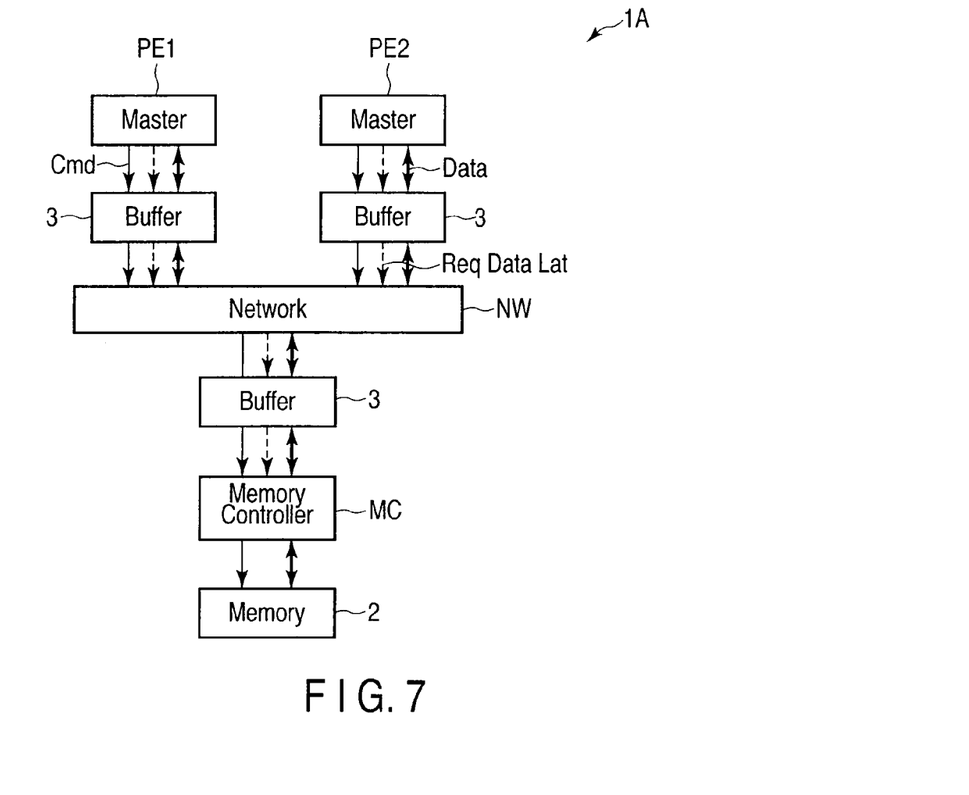
FIG. 7 is a block diagram showing an application of the embodiment of the present invention.
Figure 8:
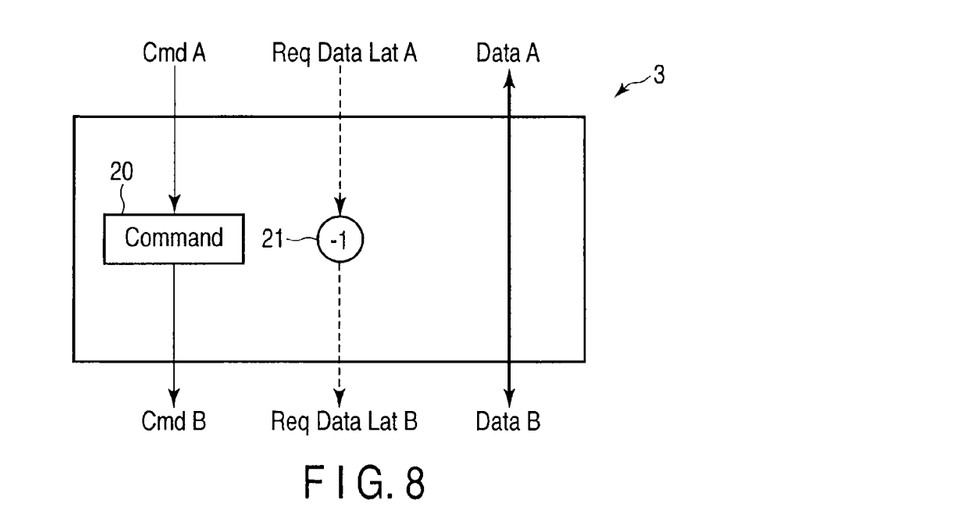
FIG. 8 is a block diagram showing one example of the internal configuration of a buffer circuit.
Figure 9:
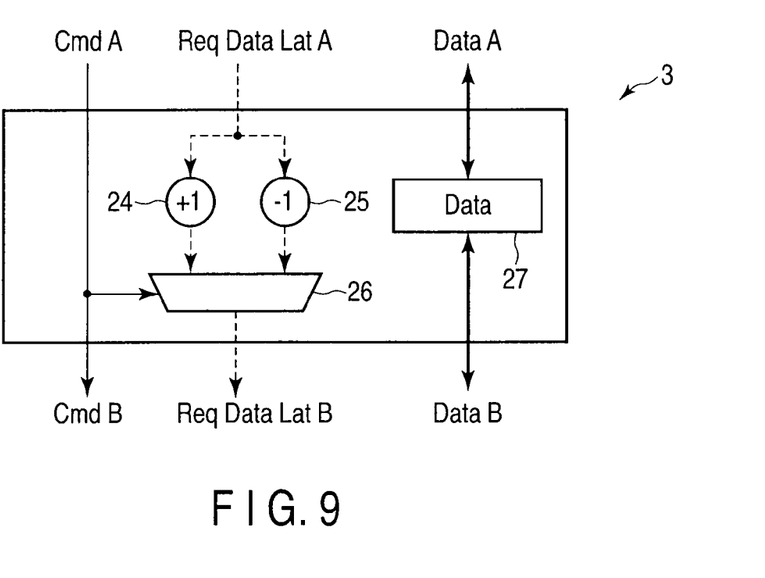
FIG. 9 is a block diagram showing one example of the internal configuration of the buffer circuit.

An application of the embodiment of the present invention is described with FIG. 7 to FIG. 9. It is to be noted that the same signs are assigned to the same members as those described above and such members are not described in detail.

FIG. 7 shows a data transfer apparatus 1A in the application of the embodiment of the present invention.

As shown in FIG. 7, buffer circuits 3 are inserted in data transfer paths within the data transfer apparatus 1A, such that command signals Cmd or data signals Data are pipeline-processed. According to this configuration, it is possible to prevent the decrease of an operation frequency, and provide a data transfer apparatus 1A of a large scale and of a high operation frequency.

However, in such a case, a latency caused by the inserted buffer circuits 3 is generated. Therefore, if a latency signal ReqDataLat is provided in addition to the command signal Cmd and the data signal Data as in the embodiment of the present invention, it may be possible to not achieve consistency of latency between operation modules PE1, PE2 and a memory controller MC. Thus, the buffer circuit 3 which can assure the consistency of latency will be described with FIG. 8 and FIG. 9.

In the buffer circuit 3 shown in FIG. 8, a command signal is input to an internal buffer 20, and one cycle passes when the command signal passes through the internal buffer 20. On the contrary, a data signal is output to the outside without passing through the internal buffer when passing through the buffer circuit 3, so that there is no increase or decrease of cycles, and the data signal passes through the buffer circuit 3 in a zero cycle.

That is, the value of a latency signal ReqDataLatB from a output of a command signal CmdB to an input/output of a data signal DataB after the passage through the buffer circuit 3 is one cycle smaller than the value of a latency signal ReqData-LatA from a output of a command signal CmdA to an input/output of a data signal DataA before the passage through the buffer circuit 3.

Therefore, as shown in FIG. 8, a subtracter 21 is inserted in the transfer path of the latency signal ReqDataLatA, and the value indicated by the latency signal is reduced by one, such that the consistency of latency is achieved in the command signals and the data signals before and after the passage through the buffer circuit 3.

Furthermore, FIG. 9 shows an example different from the buffer circuit shown in FIG. 8. In the buffer circuit 3 shown in FIG. 9, an internal buffer 27 is provided in the transfer path of the data signal. In this case, there is a difference in the method of achieving the consistency of the latency between the write operation and the read operation.

In the case of the write operation, the internal buffer 27 is provided in the transfer path of the data signal DataA, and the data signal DataA is buffered by the internal buffer 27, so that a period of one cycle passes. On the other hand, the command signal CmdA passes through the buffer circuit 3 without being buffered, unlike the data signal DataA, so that the command signal CmdA is output to the outside in zero cycle. That is, the value of the latency signal ReqDataLatB from the output of the command signal CmdB to the input of the data signal DataB after the passage through the buffer circuit 3 is one cycle larger than the value of the latency signal ReqData-LatA from the output of the command signal CmdA to the input of the data signal DataA before the passage through the buffer circuit 3.

In the read operation, a period of one cycle is needed for the data signal alone, as in the write operation. However, in the read operation, while the command signals Cmd are transferred from the operation modules PE1, PE2 to the memory module 2, the data signals Data are transferred from the memory module 2 to the operation modules PE1, PE2, so that there is a difference in signal transfer direction between the command signals and the data signals.

Therefore, the value of the latency signal ReqDataLatB from the output of the command signal CmdB to the output of the data signal DataB after the passage through the buffer circuit 3 has to be one cycle smaller than the value of the latency signal ReqDataLatA from the output of the command signal CmdA to the output of the data signal DataA before the passage through the buffer circuit 3.

Thus, as shown in FIG. 9, an adder 24 and a subtracter 25 are provided in the transfer paths of the latency signal within the buffer circuit 3, so that the value of the input latency signal is increased or decreased by one. The latency signal to which a value has been added by the adder 24 corresponds to the write operation, while the latency signal from which a value has been subtracted by the subtracter 25 corresponds to the read operation. Then, one of the latency signals corresponding to the write operation or the read operation is selected by a multiplexer 26 which uses the command signal CmdA as a selection signal.

Consequently, the consistency of the latency between the command signal and the data signal is assured for the write operation and the read operation in the data transfer apparatus 1A.

In addition, when internal buffers are provided in the respective transfer paths of the command signal and the data signal, the operation is similar to the case where the above-mentioned two configurations are connected in series. Therefore, there is no need for addition and subtraction processing for the latency signal in the case of the write operation, but the value of the latency signal has to be two cycles smaller in the case of the read operation.

As described above, the buffer circuit 3 shown in FIG. 8 or FIG. 9 is used as the buffer circuit 3 for the data transfer apparatus 1A shown in FIG. 7. Thus, the consistency of the latency between the command signal and the data signal in the data transfer apparatus 1A is assured by the buffer circuit 3 shown in FIG. 8 and FIG. 9.

Consequently, according to the application of the embodiment of the present invention, it is possible to improve the data transfer efficiency of the semiconductor integrated circuit, and provide a semiconductor integrated circuit of a large scale operating at a high operation frequency. In addition, while the two operation modules PE1, PE2 are shown for simplicity in explanation in the present application, three or more operation modules may be connected to one network.

(4) Modification

Figure 10:
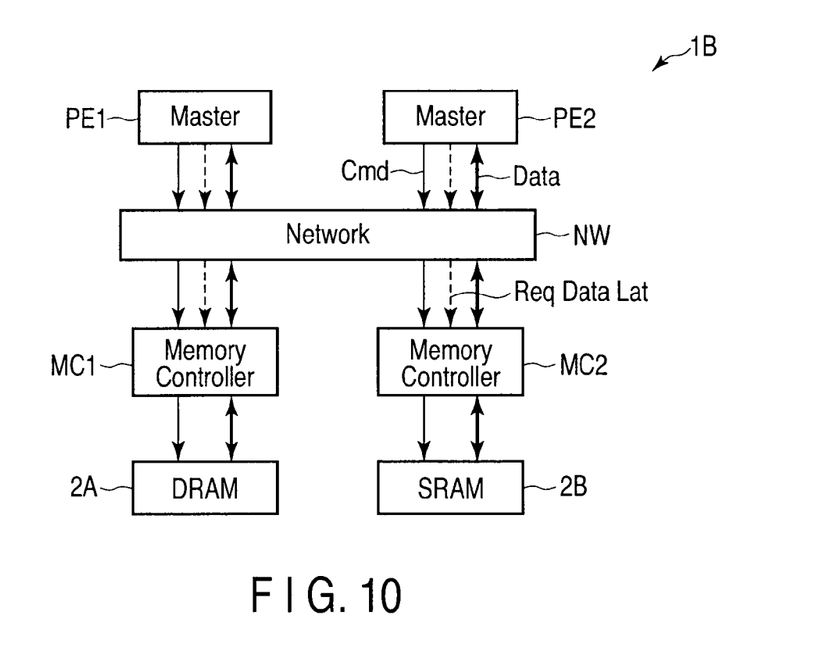
FIG. 10 is a block diagram showing a modification of the embodiment of the present invention.

A modification of the embodiment of the present invention is described with FIG. 10. It is to be noted that the same signs are assigned to the same members and such members are not described in detail.

FIG. 10 shows a data transfer apparatus 1B in the modification of the embodiment of the present invention. In the configuration of the data transfer apparatus 1 described above, one memory controller MC is connected to the network NW. However, the present invention is not limited to this, and a plurality of memory controllers MC1, MC2 and a plurality of memory modules 2A, 2B may be connected to one network NW, as in the data transfer apparatus 1B shown in FIG. 10.

In the data transfer apparatus 1B having such a configuration, the latency from the output of a command signal Cmd to the input/output of a data signal may be different for each of the memory controllers MC1, MC2 and each of the memory modules 2A, 2B. For example, as shown in FIG. 10, a DRAM 2A and an SRAM 2B are connected as the memory modules 2A, 2B to the memory controllers MC1, MC2, respectively. Instead of the DRAM 2A or the SRAM 2B, a flash memory may be connected to memory controller MC1, MC2. It is desirable that the latency from the output of the command signal Cmd to the input/output of the data signal Data is large for the data transfer of the DRAM, while it is desirable that the latency from the output of the command signal Cmd to the input/output of the data signal Data is small for the data transfer of the SRAM. As a result, there is a difference between the memory controller MC1 and the memory controller MC2 in the values of latency signals required by operation modules PE1, PE2.

Therefore, when the third arbitration method is used as the arbitration method of the network NW, the threshold value for the judgment of the arbitration is desirably independently set depending on the latency required by the memory controllers MC1, MC2.

In addition, while the two memory controllers MC1, MC2 are shown for simplicity in explanation in the present modification, three or more memory controllers may be connected to one network.

Furthermore, a plurality of networks may be interposed between the operation modules PE1, PE2 and the memory controllers MC1, MC2. In this configuration, when the configurations of the plurality of networks are dynamically changed, a signal indicating information on the latency between the memory controller and the plurality of networks may be further added.

Additionally, while the data transfer apparatus 1, 1A, 1B using the memory controller MC and the memory module as slave devices has been described in the embodiment of the present invention, the present invention is not limited to this. For example, a hard disk interface may be used instead of the memory controller MC, and a hard disk may be used instead of the memory module 2.

As described above, in the modification of the embodiment of the present invention as well, it is possible to improve the data transfer efficiency of the semiconductor integrated circuit.

3. Other

The embodiment of the present invention makes it possible to improve the data transfer efficiency of the semiconductor integrated circuit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit comprising:
    a plurality of master devices which issue data transfer requests;
    at least one slave device which performs data transfer in accordance with the data transfer requests; and
    a network which arbitrates the plurality of data transfer requests respectively issued from the plurality of master devices, and informs the at least one slave device of the arbitration result, thereby performing data transfer between the plurality of master devices and the at least one slave device,
    wherein, when issuing a data transfer request, one of the plurality of master devices informs the network of a period which extends from the issuance of the data transfer request to the start of the data transfer and which changes according to an operation of the one of a plurality of master devices.

2. The semiconductor integrated circuit according to claim 1, wherein
    the network has an arbiter which arbitrates the data transfer requests.

3. The semiconductor integrated circuit according to claim 2, wherein
    the arbiter makes an arbitration so that the at least one slave device preferentially accepts the data transfer request having a short period which extends from the issuance of the data transfer request to the start of the data transfer, among the data transfer requests.

4. The semiconductor integrated circuit according to claim 2, wherein
    the arbiter retains a priority order of data transfer set to each of the plurality of master devices, and
    when the sum of a period of one of the plurality of master devices set to a low priority order which extends from the issuance of the data transfer request to the start of the data transfer and a period of the data transfer is equal to or less than a period of another of the plurality of master devices set to a high priority order which extends from the issuance of the data transfer request to the start of the data transfer, the arbiter makes an arbitration so that the data transfer of the one of the plurality of master devices set to the low priority order is executed before the data transfer of the another of the plurality of master devices set to the high priority order.

5. The semiconductor integrated circuit according to claim 2, wherein
    the arbiter retains a threshold value, and the arbiter does not accept a data transfer request from among the data transfer requests when the period which extends from the issuance of the data transfer request to the start of the data transfer is more than the threshold value.

6. The semiconductor integrated circuit according to claim 5, wherein
    the arbiter changes the threshold value during operation.

7. The semiconductor integrated circuit according to claim 1, wherein
    one of the plurality of master devices issues a data transfer request to the network before the end of operation processing of the one of the plurality of master devices and informs the network of a period which extends from the issuance of the data transfer request to the start of data transfer.

8. The semiconductor integrated circuit according to claim 7, wherein
    the one of the plurality of master devices is an operation module,
    the operation module having:
    a controller which controls the operation of the operation module;
    a buffer which temporarily retains data; and
    an operator which operates the data retained in the buffer.

9. The semiconductor integrated circuit according to claim 8, wherein
    the buffer is an instruction cache memory.

10. The semiconductor integrated circuit according to claim 8, wherein
    the buffer is a data cache memory.

11. The semiconductor integrated circuit according to claim 7, wherein
    the one of the plurality of master devices is an operation module comprising a DMA controller,
    the DMA controller having:
    a controller which controls the operation of the DMA controller; and
    a buffer which temporarily retains data.

12. The semiconductor integrated circuit according to claim 1, wherein
    the at least one slave device has:
    a counter which increments a value at regular time intervals; and
    a plurality of registers which retain the data transfer requests and a data transfer start times corresponding to the data transfer requests.

13. The semiconductor integrated circuit according to claim 12, wherein
    the at least one slave device executes the data transfer requests retained in the plurality of registers whose data transfer start times are equal to or less than the value of the counter.

14. The semiconductor integrated circuit according to claim 1, wherein
    the at least one slave device comprises a plurality of slave devices and the plurality of slave devices are memory controllers.

15. The semiconductor integrated circuit according to claim 14, wherein
    a DRAM is connected to each of the memory controllers.

16. The semiconductor integrated circuit according to claim 14, wherein a flash memory is connected to each of the memory controllers.

17. The semiconductor integrated circuit according to claim 14, wherein
the memory controllers are different from each other in the period which extends from the issuance of the data transfer request to the start of the data transfer.

18. The semiconductor integrated circuit according to claim 1, further comprising:
a buffer circuit provided between the master devices and the network or between the network and the slave device.

19. The semiconductor integrated circuit according to claim 18, wherein the buffer circuit comprises:
an internal buffer which buffers the data transfer request; and
a subtracter which performs subtraction processing for a period which extends from the issuance of the data transfer request to the start of the data transfer.

20. The semiconductor integrated circuit according to claim 18, wherein the buffer circuit comprises:
an internal buffer which buffers data based on the data transfer request;
a subtracter which performs subtraction processing for a period which extends from the issuance of the data transfer request to the start of the data transfer;
an adder which performs addition processing for a period which extends from the issuance of the data transfer request to the start of the data transfer; and
a selection circuit which uses the data transfer request as a selection signal to select one of an output of the subtracter and an output of the adder.

* * * * *